United States Patent
Hoshi et al.

(10) Patent No.: US 6,476,518 B1
(45) Date of Patent: Nov. 5, 2002

(54) LOW POWER CONSUMPTION TYPE AUTOMOBILE-MOUNTED CONTROLLER

(75) Inventors: Toshiyuki Hoshi, Miyagi-ken (JP); Ken Mizuta, Miyagi-ken (JP); Satoshi Terashita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 297 days.

(21) Appl. No.: 09/616,577

(22) Filed: Jul. 14, 2000

(30) Foreign Application Priority Data

Jul. 16, 1999 (JP) .......................................... 11-203395

(51) Int. Cl.[7] .................................................. H02J 7/00
(52) U.S. Cl. ...................... 307/10.7; 307/10.1; 307/130; 700/12
(58) Field of Search ........................ 307/86, 10.1, 10.7, 307/116, 130; 700/12

(56) References Cited

U.S. PATENT DOCUMENTS

| | | | |
|---|---|---|---|
| 5,138,246 A | * 8/1992 | Kobayashi | 307/10.7 |
| 5,153,558 A | * 10/1992 | Robinson et al. | 180/279 |
| 5,375,247 A | * 12/1994 | Hueser | 365/229 |
| 5,522,034 A | * 5/1996 | Watari et al. | 307/10.7 |
| 5,539,610 A | * 7/1996 | Williams et al. | 307/10.7 |
| 5,774,044 A | * 6/1998 | Hayashi | 180/287 |
| 5,790,961 A | * 8/1998 | Ingram et al. | 455/343 |
| 5,936,317 A | * 8/1999 | Sasanouchi et al. | 307/10.1 |
| 5,952,801 A | 9/1999 | Boisvert et al. | 318/468 |
| 6,084,384 A | * 7/2000 | Kawamoto et al. | 307/10.7 |
| 6,268,663 B1 | * 7/2001 | Abe et al. | 307/10.6 |

FOREIGN PATENT DOCUMENTS

| | | | | |
|---|---|---|---|---|
| EP | 1069667 A2 | * | 1/2001 | H02J/7/00 |
| JP | 2001-37078 | * | 7/1999 | H02J/1/00 |
| JP | 2001-341595 | * | 12/2001 | B60R/16/02 |

* cited by examiner

*Primary Examiner*—Brian Sircus
*Assistant Examiner*—Roberto J. Rios
(74) *Attorney, Agent, or Firm*—Brinks Hofer Gilson & Lione

(57) ABSTRACT

A low power consumption type automobile-mounted controller capable of switching so as not to continue power consumption of the automobile-mounted power source when the automobile has not been used over a long term. The low power consumption type automobile-mounted controller comprises: a microcontroller unit having a power supply port, a voltage detection port, a control port, a communication port, and an input port; a first power supply path connected to the automobile-mounted power source through a change-over switch for turning ON/OFF the power supply port; a second power supply path for connecting the power supply port to the automobile-mounted power source through a controllable switch; and power open/close command means for turning ON/OFF the controllable switch in response to a power close command signal or a power open command signal, and operates in such a manner that on receipt of the power open command signal while the first power supply path is intercepted by turning OFF the change-over switch, the power open/close command means turns OFF the controllable switch to intercept the second power supply path.

6 Claims, 4 Drawing Sheets

LOW POWER CONSUMPTION TYPE AUTOMOBILE-MOUNTED CONTROLLER

BACKGROUND OF THE INVENTION

1. Technical Field of the Invention

The present invention relates to a low power consumption type automobile-mounted controller, and more particularly to a low power consumption type automobile-mounted controller capable of reducing power consumption of an automobile-mounted power source by disconnecting a connection of the automobile-mounted power source to a microcontroller unit while an automotive engine is kept in a stopped state for many hours.

2. Prior Art

Generally, an automobile-mounted controller mounted on an automobile, for operating each portion of the automobile, is provided with one or more microcontroller units (MCU) for controlling the entire automobile-mounted controller. This microcontroller unit is set to a normal operation mode of executing its original control operation while the ignition switch is turned ON and the automotive engine is operating, but while the ignition switch is turned OFF and the automotive engine is stopped, the microcontroller unit is set to a sleep (standby) operation mode of selectively executing only a specific control operation.

When the microcontroller unit has been set to the sleep operation mode, the automobile-mounted power source has been connected to a power supply port, but power consumption of the automobile-mounted power source in the microcontroller unit is little because the original control operation is not performed. For this reason, the automobile-mounted controller is set to an operation mode having slight power consumption of the automobile-mounted power source, that is, the low power consumption mode.

While the ignition switch is turned OFF and the automotive engine is stopped, the known automobile-mounted controller has been set to the low power consumption mode for the time being, but the power consumption in the automobile-mounted power source is continuing although little by little because the automobile-mounted power source has been connected to the power supply port of the microcontroller unit.

If an automobile has not been used over a long term by transporting the automobile or due to some other circumstances, the automotive engine is also maintained at a stopped state, and for that reason, charging for the automobile-mounted power source is not performed. Therefore, power consumption of the automobile-mounted power source continues even by power consumption of the automobile-mounted controller little by little. Thus, when the power consumption in the automobile-mounted power source has continued, if an attempt is made to start the engine on using the automobile, output voltage from the automobile-mounted power source has dropped lower than the rated voltage value, thus possibly causing the unexpected such as failure to start the engine.

SUMMARY OF THE INVENTION

The present invention has been achieved in the light of the above-described technical background, and is aimed to provide a low power consumption type automobile-mounted controller capable of switching so as to prevent power consumption in the automobile-mounted power source from continuing while the automobile has not been used over a long term.

In order to accomplish the above-described object, a low power consumption type automobile-mounted controller according to the present invention is provided at least with: a microcontroller unit having a power supply port, a voltage detection port, a control port, a communication port, and an input port; a first power supply path connected to the automobile-mounted power source through a change-over switch for turning ON/OFF the power supply port; a second power supply path for connecting the power supply port to the automobile-mounted power source through a controllable switch; and power open/close command means for turning ON/OFF the controllable switch in response to a power close command signal or a power open command signal in such a manner that on receipt of a power open command signal while the first power supply path is intercepted by turning OFF the change-over switch, the power open/close command means turns OFF the controllable switch to intercept the second power supply path.

In a first concrete example using the above-described structure, the power open command signal is supplied from another microcontroller unit connected to the microcontroller unit through a communication line.

In a second concrete example using the above-described structure, the power open command signal is supplied when a second change-over switch connected to the microcontroller unit is turned ON.

In a third concrete example using the above-described structure, the power open command signal is supplied when the change-over switch is turned OFF.

In a fourth concrete example using the above-described structure, the power open command signal is supplied when voltage detection output from voltage detection means of the automobile-mounted power source connected to the second power supply path lowers to lower than a predetermined value.

In the other concrete samples using the above-described structure, the change-over switch is an ignition switch.

According to the low power consumption type automobile-mounted controller using the above-described structure, while the first power supply path is intercepted by turning OFF the change-over switch, that is, when a power open command signal is generated and is supplied to the power open/close command means while the ignition switch is turned OFF and the automotive engine is stopped, the power open/close command means supplies a switch-off signal to the controllable switch and turns OFF the controllable switch to intercept the second power supply path, whereby the connected state between the power supply port of the microcontroller unit and the automobile-mounted power source is cut off, and the microcontroller unit is set to a super-low power consumption operation mode of eliminating any slight power consumption in the automobile-mounted power source. As a result, the power consumption in the automobile-mounted power source does not continue even if the automobile has not been used over a long term, and it is possible to prevent the unexpected from occurring such as failure to start the engine owing to lowered output voltage from the automobile-mounted power source when reusing the automobile.

DETAILED DESCRIPTION OF THE PREFERRED EMBODIMENTS

Hereinafter, with reference to the drawings, descriptions will be made of embodiments of the present invention.

Figure 1:
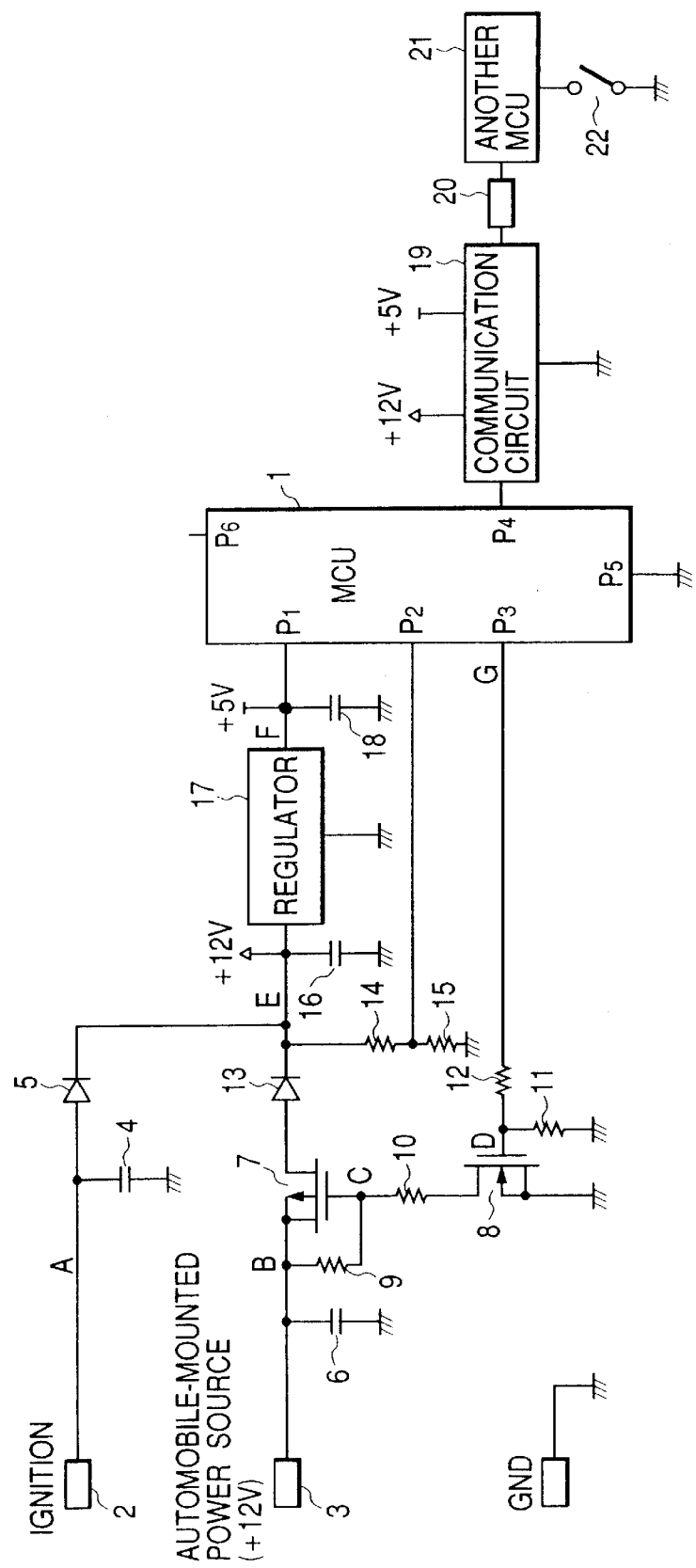
FIG. 1 is a structural view showing a low power consumption type automobile-mounted controller according to a first embodiment of the present invention.

FIG. 1 is a structural view showing a low power consumption type automobile-mounted controller according to a first embodiment of the present invention.

As shown in FIG. 1, the low power consumption type automobile-mounted controller according to the first embodiment is provided with: a microcontroller unit (MCU) 1; an ignition switch connecting end 2; an automobile-mounted power source (battery) connecting end 3; a first smoothing capacitor 4; a first diode 5; a second smoothing capacitor 6; a first switching field effect transistor (FET) (controllable switch) 7; a second switching field effect transistor (FET)(power open/close command means) 8; a first gate bias resistance 9; a second gate bias resistance 10; a third gate bias resistance 11; a fourth gate bias resistance 12; a second diode 13; bleeder resistances 14 and 15; a third smoothing capacitor 16; a voltage regulator 17; a fourth smoothing capacitor 18; a communication circuit 19; a transmission line (bus line) (communication circuit) 20; another microcontroller unit (MCU) 21; and a manual switch 22. The microcontroller unit 1 is provided with: a power supply port $P_1$; a voltage detection port $P_2$; a control port $P_3$; a communication port $P_4$; a grounding port $P_5$; and an input port $P_6$. Each circuit element 1 to 22 and each port $P_1$ to $P_5$ are connected as shown in FIG. 1.

In this case, a path reaching the power supply port $P_1$ from the ignition switch connecting end 2 through the first smoothing capacitor 4, the first diode 5, the third smoothing capacitor 16, the voltage regulator 17 and the fourth smoothing capacitor 18 respectively constitutes the first power supply path. A path reaching the power supply port $P_1$ from the automobile-mounted power connecting end 3 through the second smoothing capacitor 6, the first switching field effect transistor 7, the second diode 13, the voltage regulator 17 and the fourth smoothing capacitor 18 respectively constitutes the second power supply path.

The low power consumption type automobile-mounted controller according to the first embodiment using the above-described structure operates as follows.

To begin with, the description will be made of an operation when the microcontroller unit 1 is set to the normal operation mode by turning ON the ignition switch, and an operation on setting to the sleep operation mode while it has been set to the normal operation mode.

When the ignition switch (not shown) is turned ON, DC voltage (+12V) is supplied from the automobile-mounted power source (not shown) to the ignition switch connecting end 2. This DC voltage is smoothed by the first smoothing capacitor 4, flows through the first diode 5, and is smoothed by the third smoothing capacitor 16 to be supplied to the input of the voltage regulator 17. The voltage regulator 17 voltage-regulates DC voltage (+12V) supplied to output as low-tension DC voltage (+5V). This low tension DC voltage is smoothed by the fourth smoothing capacitor 18 to be supplied to the power supply port $P_1$ of the microcontroller unit 1. Also, DC voltage (+12V) is supplied from the automobile-mounted power source to the automobile-mounted power connecting end 3, and this DC voltage is smoothed by the second smoothing capacitor 6, and then is supplied to the input of the voltage regulator 17 through the first switching field effect transistor 7 and the second diode 13 which are in an ON-state. Thereafter, the voltage regulator 17 voltage-regulates DC voltage (+12V) thus supplied to output as low-tension DC voltage (+5V). This low-tension DC voltage is smoothed by the fourth smoothing capacitor 18 to be supplied to the power supply port $P_1$ of the microcontroller unit 1. At this point of time, voltage at point A shown in FIG. 1 is +12V, voltage at point B is +12V, voltage at point C is 0V, voltage at point D is +5V, voltage at point E is +12V, voltage at point F is +5V, voltage at point G is +5V, and the microcontroller unit 1 is set to the normal operation mode, and executes a required control operation in accordance with a built-in program.

When the ignition switch is turned OFF in this state, supply of DC voltage (+12V) to the ignition switch connecting end 2 is stopped to open the first power supply path. Since, however, the second power supply path still remains closed, low-tension DC voltage (+5V) is continuously supplied to the power supply port $P_1$ of the microcontroller unit 1. At this point of time, voltage at point A shown in FIG. 1 is 0V, voltage at point B is +12V, voltage at point C is 0V, voltage at point D is +5V, voltage at point E is +12V, voltage at point F is +5V, voltage at point G is +5V, and the microcontroller unit 1 is set from the normal operation mode to the sleep operation mode, is caused to be in a standby state, and executes only a specific control operation.

Next, the description will be made of an operation on shifting the microcontroller unit 1 to a super-low power consumption operation mode when the microcontroller unit 1 has been set to the normal operation mode or the sleep operation mode.

When a manual switch 22 connected to another microcontroller unit 21 is temporarily closed, the microcontroller unit 21 outputs a power open command signal in response to ON of the manual switch 22. This power open command signal is supplied to the communication circuit 19 through the transmission path 20, and is supplied to the communication port $P_4$ of the microcontroller unit 1 from the communication circuit 19. Upon receipt of the power open command signal, the microcontroller unit 1 changes output voltage (voltage at point G) of the control port $P_3$ from the +5V (high level) until then to 0V (low level). When voltage at point G becomes 0V, the gate voltage (voltage at point D) of the second switching field effect transistor 8 also becomes 0V, and the second switching field effect transistor 8 becomes OFF. The OFF of the second switching field effect transistor 8 causes the gate voltage (voltage at point C) of the first switching field effect transistor 7 to become +12V, and the first switching field effect transistor 7 to become OFF. For this reason, the automobile-mounted power source voltage (voltage at point B) of +12V to be applied to the automobile-mounted power source connecting end 3 is blocked by the first switching field effect transistor 7 so that the input voltage (voltage at point E) and output voltage (voltage at point F) of the voltage regulator 17 become both 0V to cut off the connection between the power supply port $P_1$ of the microcontroller unit 1 and the automobile-mounted power source. At this time, the microcontroller unit 1 is set to the low power consumption operation mode, and enters a state in which the power of the automobile-mounted power source is not consumed.

Next, the description will be made of an operation on returning the microcontroller unit 1 to the normal operation mode when it has been set to the super-low power consumption operation mode.

When the ignition switch is turned ON, DC voltage (+12V) is supplied from the automobile-mounted power source to the ignition switch connecting end 2. This DC voltage (+12V) flows, as in the above-described case, through the first diode 5, is voltage-regulated by the voltage regulator 17 to become low-tension DC voltage (+5V), is supplied to the power supply port $P_1$ of the microcontroller unit 1, and the first power supply path becomes closed. The low-tension DC voltage (+5V) has been supplied to the power supply port $P_1$, whereby output voltage (voltage at point G) from the control port $P_3$ becomes 5V (high level) to turn the second switching field effect transistor 8 and the first switching field effect transistor 7 ON respectively. Thus, the DC voltage (+12V) supplied to the automobile-mounted power source connecting end 3 flows through the first switching field effect transistor 7 and the second diode 13, which have turned ON, is voltage-regulated by the voltage regulator 17 to become low-tension DC voltage (+5V), is supplied to the power supply port $P_1$ of the microcontroller unit 1, and the second power supply path also becomes closed. At this time, the microcontroller unit 1 returns from the low power consumption operation mode to the normal operation mode, and executes a required control operation again in accordance with the built-in program.

In this manner, according to the low power consumption type automobile-mounted controller of the first embodiment, by operating the manual switch 22 when the microcontroller unit 1 has been set to the normal operation mode or the sleep operation mode, the microcontroller unit 1 is set to the super-low power consumption operation mode, in which the mobile-mounted power source is not connected to the power supply port $P_1$ thereof. Therefore, even if the automobile has not been used over a long term, the power of the mobile-mounted power source is not consumed, nor is the output voltage from the mobile-mounted power source lowered. Accordingly, it is possible to prevent the unexpected such as failure to start the engine from occurring when reusing the automobile.

Figure 2:
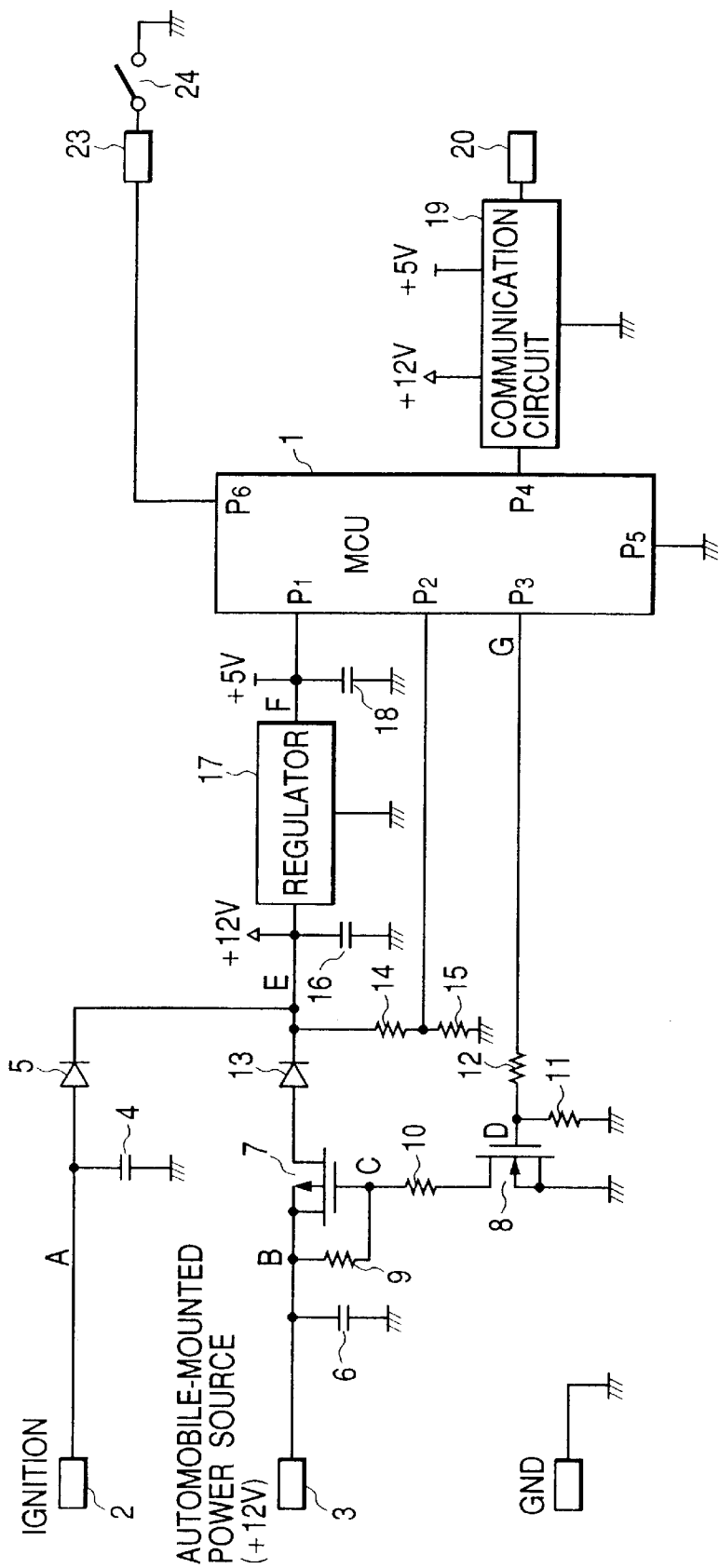
FIG. 2 is a structural view showing a low power consumption type automobile-mounted controller according to a second embodiment of the present invention.

FIG. 2 is a structural view showing a low power consumption type automobile-mounted controller according to a second embodiment of the present invention.

As shown in FIG. 2, the low power consumption type automobile-mounted controller according to the second embodiment has a second transmission path 23 connected to the input port $P_6$ of the microcontroller unit 1, and a second manual switch (second change-over switch) 24 connected to the second transmission path 23. This second manual switch 24 is provided instead of a manual switch 22 connected to another microcontroller unit 21 in a low power consumption type automobile-mounted controller according to the first embodiment. The structure is identical with the structure of the low power consumption type automobile-mounted controller according to the first embodiment except for structure in which the second manual switch 24, which replaces the manual switch 22, is connected to the second transmission path 23. Therefore, concerning the structure of the low power consumption type automobile-mounted controller according to the second embodiment, a further description will be omitted.

As regards an operation of the low power consumption type automobile-mounted controller according to the second embodiment using the above-described structure, an operation on setting the microcontroller unit 1 to the normal operation mode by turning ON the ignition switch, an operation on setting it to the sleep operation mode when it has been set to the normal operation mode, and an operation on returning the microcontroller unit 1 to the normal operation mode when it has been set to the super-low power consumption operation mode are all identical with these operations in the low power consumption type automobile-mounted controller according to the first embodiment because the structure of portions for executing these operations is identical with the structure of the low power consumption type automobile-mounted controller according to the first embodiment. For this reason, these operations in the low power consumption type automobile-mounted controller according to the second embodiment would be duplicative of the first embodiment, and their description will be omitted.

In the low power consumption type automobile-mounted controller according to the second embodiment, the description will be made of an operation on shifting the microcontroller unit 1 to the super-low power consumption operation mode when the microcontroller unit 1 has been set to the normal operation mode or the sleep operation mode.

When a second manual switch 24 connected to a second transmission path 23 is temporarily closed, a power open command signal is outputted, and this power open command signal is supplied to an input port $P_6$ of the microcontroller unit 1 through the second transmission path 23. Upon receipt of the power open command signal, the microcontroller unit 1 changes output voltage (voltage at point G) of the control port $P_3$ from +5V until then to 0V as in the case of the low power consumption type automobile-mounted controller according to the second embodiment. When voltage at point G becomes 0V, the gate voltage (voltage at point D) of the second switching field effect transistor 8 also becomes 0V, and the second switching field effect transistor 8 becomes OFF. The OFF of the second switching field effect transistor 8 causes the gate voltage (voltage at point C) of the first switching field effect transistor 7 to becomes +12V, and the first switching field effect transistor 7 also to become OFF. For this reason, the automobile-mounted source voltage (voltage at point B) of +12V to be applied to the automobile-mounted power source connecting end 3 is blocked by the first switching field effect transistor 7 so that the input voltage (voltage at point E) and output voltage (voltage at point F) of the voltage regulator 17 become both 0V to cut off the connection between the power supply port $P_1$ of the microcontroller unit 1 and the automobile-mounted power source. In this state, the microcontroller unit 1 is set to the low power consumption operation mode, and the power of the automobile-mounted power source will not be consumed.

When the microcontroller unit 1 has been set to the normal operation mode or the sleep operation mode even in a low power consumption type automobile-mounted controller according to the second embodiment as described above, the microcontroller unit 1 can be set to the super-low power consumption operation mode, in which the automobile-mounted power source is not connected to its power supply port $P_1$, by operating the second manual switch 24.

Figure 3:
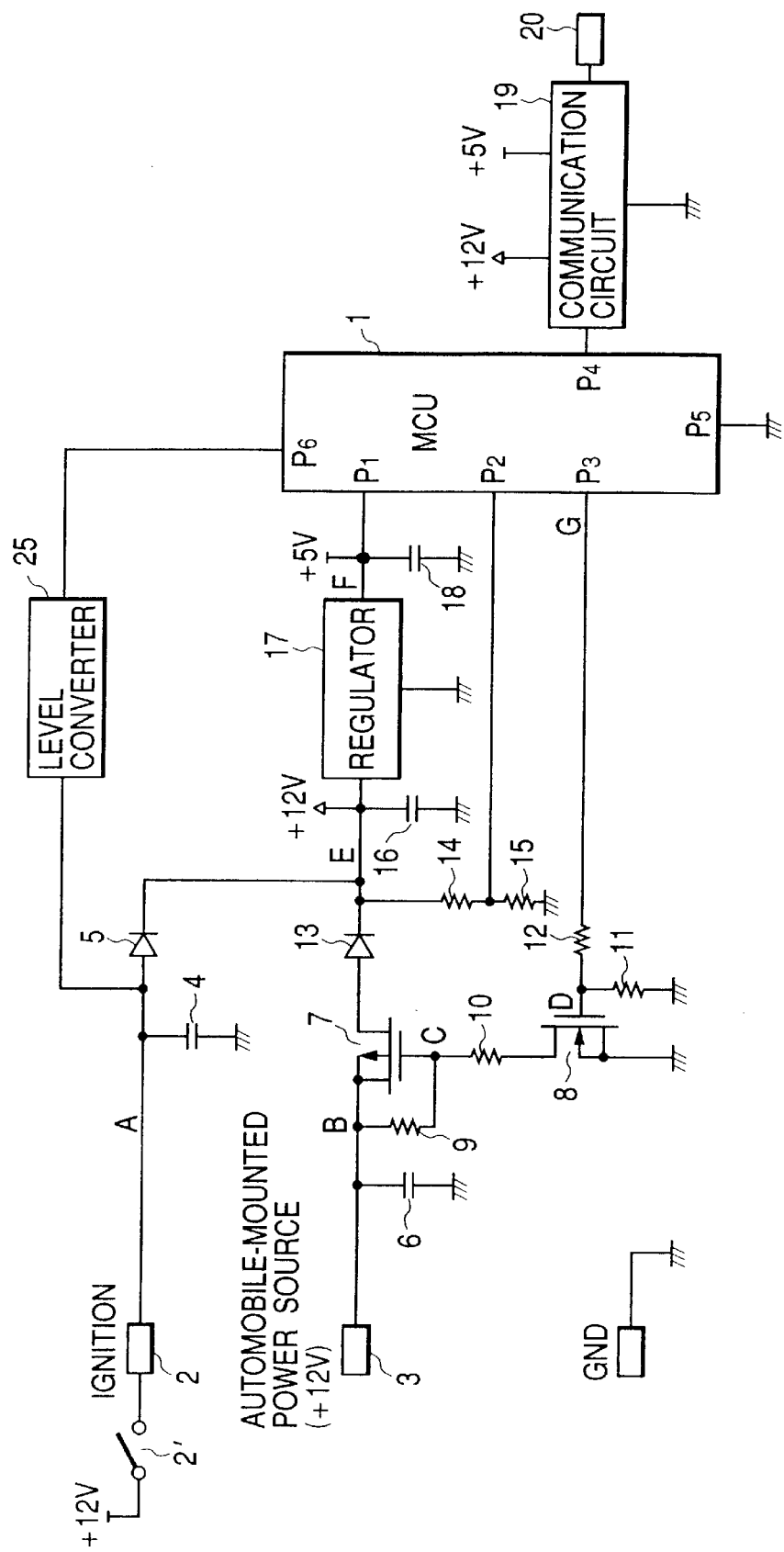
FIG. 3 is a structural view showing a low power consumption type automobile-mounted controller according to a third embodiment of the present invention.

FIG. 3 is a structural view showing a low power consumption type automobile-mounted controller according to a third embodiment of the present invention, showing an example in which the microcontroller unit 1 is not set to the sleep operation mode.

As shown in FIG. 3, the low power consumption type automobile-mounted controller according to the third embodiment is provided with a level converter (converter) 25 connected between the ignition switch connecting end 2 and the input port $P_6$ of the microcontroller unit 1, and an ignition switch (change-over switch) 2'. This ignition switch 2' and the level converter 25 are provided in place of the manual switch 22 connected to another microcontroller unit 21 in the low power consumption type automobile-mounted controller according to the first embodiment. The structure of the low power consumption type automobile-mounted controller according to the third embodiment is identical with that of the low power consumption type automobile-mounted controller according to the first embodiment except for structure in which the level converter 25 for replacing the manual switch 22 is connected between the ignition switch connecting end 2 and the input port $P_6$ of the microcontroller unit 1. Therefore, a further description thereof will be omitted.

As regards an operation of the low power consumption type automobile-mounted controller according to the third embodiment using the above-described structure, an operation when the microcontroller unit 1 is set to the normal operation mode by turning ON the ignition switch, and an operation on returning the microcontroller unit 1 to the normal operation mode when it has been set to the super-low power consumption operation mode are both identical with these operations in the low power consumption type automobile-mounted controller according to the first embodiment because structure of portions for executing these operations is identical with that of the low power consumption type automobile-mounted controller according to the first embodiment. For this reason, concerning these operations of the low power consumption type automobile-mounted controller according to the second embodiment, the description would be duplicative and therefore, the description will be omitted.

Here, the description will be made of an operation on shifting the microcontroller unit 1 to the super-low power consumption operation mode when the microcontroller unit 1 has been set to the normal operation mode.

When the ignition switch 2' is turned OFF, voltage of 0V is supplied to input of the level converter 25. On receipt of the voltage of 0V, the level converter 25 generates a power open command signal at the output to supply this power open command signal to an input port $P_6$ of the microcontroller unit 1. On receipt of the power open command signal, the microcontroller unit 1 changes output voltage (voltage at point G) from the control port $P_3$ from +5V until then to 0V as in the case of the low power consumption type automobile-mounted controllers according to the first and second embodiments. When the voltage at point G becomes 0V, the gate voltage (voltage at point D) of the second switching field-effect transistor 8 also becomes 0V to turn OFF the second switching field-effect transistor 8. The OFF of the second switching field-effect transistor 8 causes the gate voltage (voltage at point C) of the first switching field-effect transistor 7 to become +12V, and the first switching field-effect transistor 7 also to become OFF. For this reason, the automobile-mounted source voltage (voltage at point B) of +12V to be applied to the automobile-mounted power source connecting end 3 is blocked by the first switching field-effect transistor 7, and input voltage (voltage at point E) and output voltage (voltage at point F) of a voltage regulator 17 both become 0V to cut off the connection between the power supply port $P_1$ of the microcontroller unit 1 and the automobile-mounted power source. In this state, the microcontroller unit 1 is set to the low power consumption operation mode, and the electric power of the automobile-mounted power source will not be consumed.

Even in the low power consumption type automobile mounted controller according to the third embodiment, the microcontroller unit 1 can be set to the super-low power consumption operation mode, in which the automobile-mounted power source is not connected to its power supply port $P_1$, by turning OFF the ignition switch 2' when the micro-controller unit 1 has been set to the normal operation mode.

Figure 4:
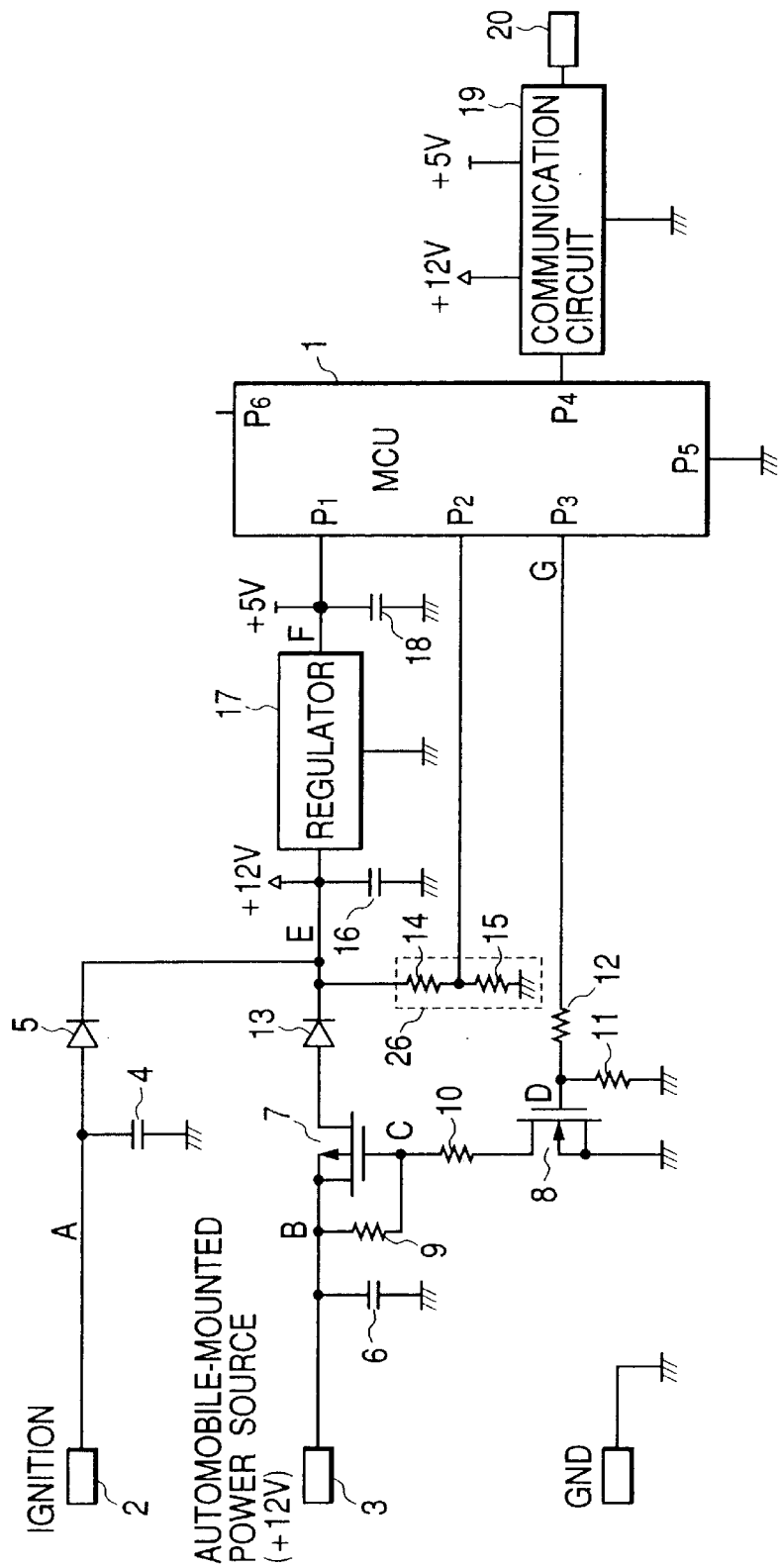
FIG. 4 is a structural view showing a low power consumption type automobile-mounted controller according to a fourth embodiment of the present invention.

FIG. 4 is a structural view showing a low power consumption type automobile-mounted controller according to a fourth embodiment of the present invention, showing an example in which the microcontroller unit 1 is shifted to the super-low power consumption operation mode when the microcontroller unit 1 has been set to the sleep operation mode.

As shown in FIG. 4, the low power consumption type automobile-mounted controller according to the fourth embodiment is such that it uses a voltage detecting bleeder circuit (voltage detection means) 26 connected between the input of the voltage regulator 17 and a grounding point, that the voltage detecting bleeder circuit 26 has bleeder resistances 14 and 15 connected in series, and that a connection between the bleeder resistances 14 and 15 is connected to a voltage detection port $P_2$ of the micro-controller unit 1. This voltage detecting bleeder circuit 26 is used in place of the manual switch 22 connected to another microcontroller unit 21 in the low power consumption type automobile-mounted controller according to the first embodiment. The structure of the low power consumption type automobile-mounted controller according to the fourth embodiment is identical with that of the low power consumption type automobile-mounted controller according to the first embodiment except for structure in which there is provided no manual switch 22 and therefore, a further description thereof will be omitted.

As regards an operation of the low power consumption type automobile-mounted controller according to the fourth embodiment using the above-described structure, an operation when the microcontroller unit 1 is set to the normal operation mode by turning ON the ignition switch, an operation on setting the microcontroller unit 1 to the sleep operation mode when it has been set to the normal operation mode, and an operation on returning the microcontroller unit 1 to the normal operation mode when it has been set to the super-low power consumption operation mode, are all identical with these operations in the low power consumption type automobile-mounted controller according to the first embodiment because structure of portions where these operations are executed is identical with that of the low power consumption type automobile-mounted controller according to the first embodiment. For this reason, concerning these operations of the low power consumption type automobile-mounted controller according to the fourth embodiment, the description would be duplicative and therefore, the description will be omitted.

In the low power consumption type automobile-mounted controller according to the fourth embodiment, the description will be made of an operation on shifting the microcontroller unit 1 to the super-low power consumption operation mode when the microcontroller unit 1 has been set to the sleep operation mode.

While the microcontroller unit 1 has been set to the sleep operation mode and voltage of the automobile-mounted power source is supplied to the power supply port $P_1$ of the microcontroller unit 1 through a second power supply path, the input voltage of the voltage regulator 17 is supplied to the voltage detecting bleeder circuit 26. The voltage detecting bleeder circuit 26 supplies divided voltage by the bleeder resistances 14 and 15 to a voltage detection port $P_2$ of the microcontroller unit 1 to detect the input voltage of the voltage regulator 17 by the microcontroller unit 1. When power consumption in the automobile-mounted power source of the microcontroller unit 1 continues and the input voltage of the voltage regulator 17 lowers to less than a fixed value, the voltage is supplied to the voltage detection port $P_2$ of the microcontroller unit 1 as a power open command signal. On receipt of the power open command signal, the microcontroller unit 1 changes output voltage (voltage at point G) from the control port $P_3$ from +5V until then to 0V as in the case of the low power consumption type automobile-mounted controllers according to each of the first to third embodiments. When the voltage at point G becomes 0V, the gate voltage (voltage at point D) of the second switching field-effect transistor 8 also becomes 0V to turn OFF the second switching field-effect transistor 8. The OFF of the second switching field-effect transistor 8 causes the gate voltage (voltage at point C) of the first switching field-effect transistor 7 to become +12V, and the first switching field-effect transistor 7 also to become OFF. For this reason, automobile-mounted source voltage (voltage at point B) of +12V to be applied to the automobile-mounted power source connecting end 3 is blocked by the first switching field-effect transistor 7, and input voltage (voltage at point E) and output voltage (voltage at point F) of the voltage regulator 17 both become 0V to cut off the connection between the power supply port $P_1$ of the microcontroller unit land the automobile-mounted power source. In this state, the microcontroller unit is set to the super-low power consumption operation mode, and the electric power of the automobile-mounted power source will not be consumed.

Even in the low power consumption type automobile-mounted controller according to the fourth embodiment, the microcontroller unit 1 can be set to the super-low power consumption operation mode, in which the automobile-mounted power source is not connected to its power supply port $P_1$, by means of detection voltage in the voltage detecting bleeder circuit 26 when the micro-controller unit 1 has been set to the sleep operation mode.

As described above, according to the present invention, when a power open command signal is generated and the power open command signal is supplied to the power open/close command means while the first power supply path is intercepted by turning OFF the change-over switch, that is, while the ignition switch is turned OFF to stop the automotive engine, the power open/close command means supplies a switch-OFF signal to the controllable switch to turn OFF the controllable switch for intercepting the second power supply path, whereby the connected state between the power supply port of the microcontroller unit and the automobile-mounted power source is cut off so that the microcontroller unit is set to the super-low power consumption operation mode in which any slight consumption of the electric power of the automobile-mounted power source is eliminated. Therefore, the power consumption in the automobile-mounted power source does not continue even if the automobile has not been used over a long term, and it is possible to prevent the unexpected from occurring such as failure to start the engine owing to lowered output voltage from the automobile-mounted power source when reusing the automobile.

What is claimed is:

1. A low power consumption type automobile-mounted controller, comprising: a microcontroller unit having a power supply port, a voltage detection port, a control port, a communication port, and an input port; a first power supply path connected to an automobile-mounted power source through a change-over switch for turning ON/OFF the power supply port; a second power supply path for connecting the power supply port to the automobile-mounted power source through a controllable switch; and power open/close command means for turning ON/OFF the controllable switch in response to a power close command signal or a power open command signal in such a manner that on receipt of the power open command signal while the first power supply path is intercepted by turning OFF the change-over switch, the power open/close command means turns OFF the controllable switch to intercept the second power supply path.

2. A low power consumption type automobile-mounted controller according to claim 1, wherein the power open command signal is supplied from another microcontroller unit connected to the microcontroller unit through a communication line.

3. A low power consumption type automobile-mounted controller according to claim 1, wherein the power open command signal is supplied when a second change-over switch connected to the microcontroller unit is turned ON.

4. A low power consumption type automobile-mounted controller according to claim 1, wherein the power open command signal is supplied when the change-over switch is turned OFF.

5. A low power consumption type automobile-mounted controller according to claim 1, wherein the power open command signal is supplied when voltage detection output from voltage detection means of the automobile-mounted power source connected to the second power supply path lowers below a predetermined value.

6. A low power consumption type automobile-mounted controller according to claim 1, wherein the change-over switch is an ignition switch.

* * * * *